Aug. 12, 1969  M. J. HUBER  3,460,657
TORQUE CLUTCHES

Filed Dec. 30, 1966  2 Sheets-Sheet 1

INVENTOR
MORTIMER J. HUBER
BY Robert M. Dunning
ATTORNEY

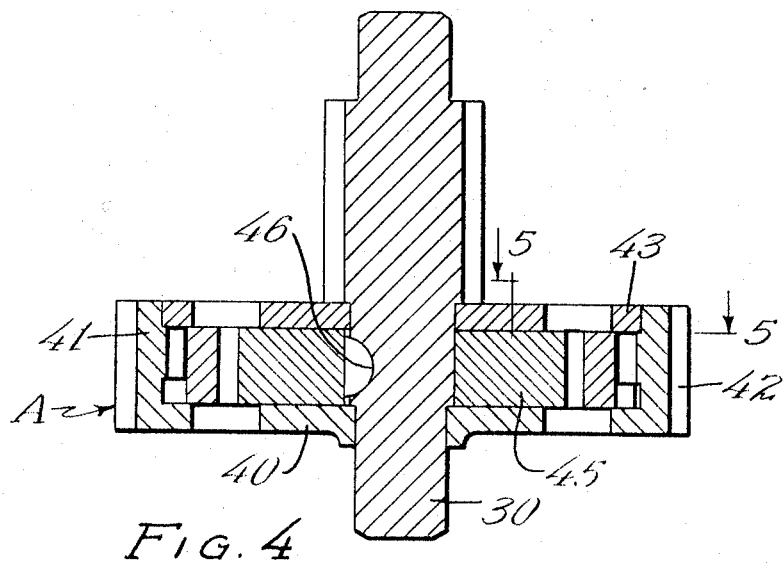
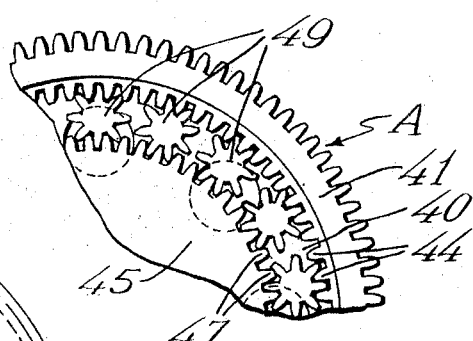
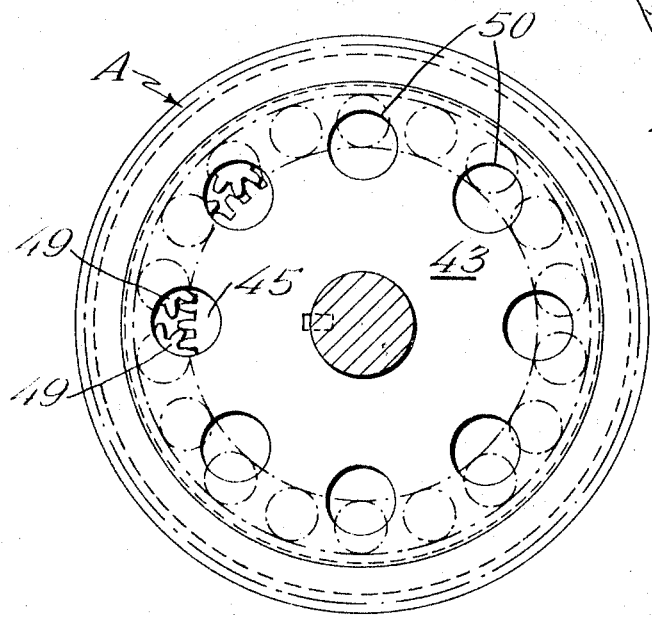

United States Patent Office 3,460,657
Patented Aug. 12, 1969

3,460,657
TORQUE CLUTCHES
Mortimer J. Huber, St. Paul, Minn., assignor to
Joseph M. Huber, White Bear Lake, Minn.
Filed Dec. 30, 1966, Ser. No. 606,379
Int. Cl. F16d 31/04
U.S. Cl. 192—61                                1 Claim

ABSTRACT OF THE DISCLOSURE

A drive mechanism is provided particularly for rotating advertising signs and the like which are rotated about a vertical axis by a motor. Such signs are subject to wind pressure which sometimes overloads the motor and at other times tends to override the motor. The one gear in the gear reduction unit is provided with an internal epicyclic gear system enclosed in a chamber and submerged in hydraulic fluid openings in the chamber walls are spaced so that some fluid is trapped between the sun gear, internal gear, and planet gears and must leak past the planet gears to escape. As a result, the gear provides a hydraulic slip clutch which operates in either direction.

This invention relates to an improvement in torque clutches and deals particularly with a clutch which is capable of permitting a variation in speed between a drive shaft and a driven shaft without injury to the drive member.

Various forms of clutches have been produced which permit the speed of a driven shaft to vary relative to the speed of rotation of the drive member without causing injury to the parts. Most such clutches are in the form of friction clutches which permit relative slippage between two rotatable parts. Obviously, clutches of this type are subject to wear, and the friction surfaces must be replaced at relatively short intervals when considerable slippage occurs. It is an object of the present invention to provide a torque clutch which will permit the variation in speed without any very considerable amount of wear between the parts.

The present invention is particularly useful in the drive mechanism between a constant speed electric motor and a display sign of the type which slowly revolves about a vertical axis. Signs of this type have an area of many square feet which are exposed to the elements. On the other hand, such signs are normally driven by an electric motor which must rotate at a substantially constant speed. In transmitting the driving power of the motor to the sign, it is desirable to permit a considerable variation in speed of the driven shaft relative to that of the drive motor. For example, when signs of the type in question are subjected to gusts of wind, it is possible that the wind will tend to rotate the sign in a reverse direction. One of the main purposes of the present invention resides in the provision of a means of permitting the driven shaft to stop or even move in a reverse direction without injury to the clutch or to the drive motor.

Signs of the type which have been described usually include a housing having a drive motor which is hermetically sealed with respect to the gear housing, and a gear reduction structure within the gear housing which will drive the driven shaft at a relatively low speed with respect to that of the drive motor. Gear housings of this type, similarly to the transmissions of motor vehicles and such units, are substantially filled with a lubricant to minimize the wear of the drive gears. It is a feature of the present invention to incorporate in a gear box of this type a torque clutch which incorporates a series of gears which are normally immersed in lubricant, and in which relative rotation between the gears is normally prevented by the liquid lubricant between the gears. However, in the event of abnormal strain tending to resist the rotation of the driven shaft, the gears may pump the fluid in a manner to permit the change in speed of the driven shaft without causing any physical damage or structural wear upon the parts.

An object of the present invention resides in the provision of a torque clutch which comprises, in effect, an epicyclic gear train including a sun gear, a concentric internal gear, and a series of planetary gears interposed between the sun gear and the peripheral gear. The gears are enclosed within a housing which is normally submerged in lubricant. Apertures are provided in angularly spaced relation through a wall of the housing in the area of the planet gears. These openings are angularly spaced apart a distance substantially equal to the diameter of the planet gears. With this arrangement, fluid may be trapped between adjoining planet gears so that considerable force is required to rotate the planet gears, thereby tending to cause rotation of the housing which includes the internal gear in unison with the sun gear. However, if sufficient resistance to the rotation of the sun gear is experienced, the planet gears will rotate about their angularly spaced axes, permitting the sun gear to rotate at a speed which differs from that of the housing or even which is in reverse to that of the housing, without causing excessive wear or damage to the parts.

These and other objects and novel features of the present invention will be more clearly and fully set forth in the following specification and claims:

FIGURE 4 is a vertical sectional view of the torque clutch illustrated in FIGURE 3.

FIGURE 5 is a horizontal sectional view through a portion of the torque clutch illustrated in FIGURE 4, the position of the section being indicated by the line 5—5 of FIGURE 4.

FIGURE 6 is a bottom plan view of the torque clutch unit, the driven shaft being indicated in section.

Figure 2:
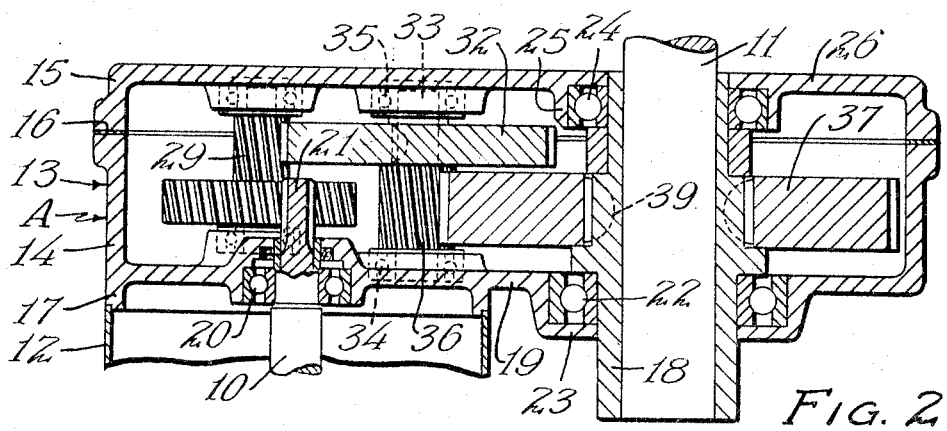
FIGURE 2 is a vertical sectional view through the unit shown in FIGURE 1, the position of the section being indicated by the line 2—2 of FIGURE 1.

While the present device is capable of many uses, it was designed to permit relative rotation between a drive shaft which is indicated in FIGURE 2 of the drawings by the numeral 10, and a driven shaft which is indicated in general by the numeral 11. The particular unit illustrated is designed to connect an electric motor, the housing of which is indicated by the numeral 12 and a display sign which is rotatably supported upon the shaft 11 and rotated thereby. The motor housing 12 is preferably sealed with relation to the gear housing which is indicated in general by the numeral 13.

Figure 1:
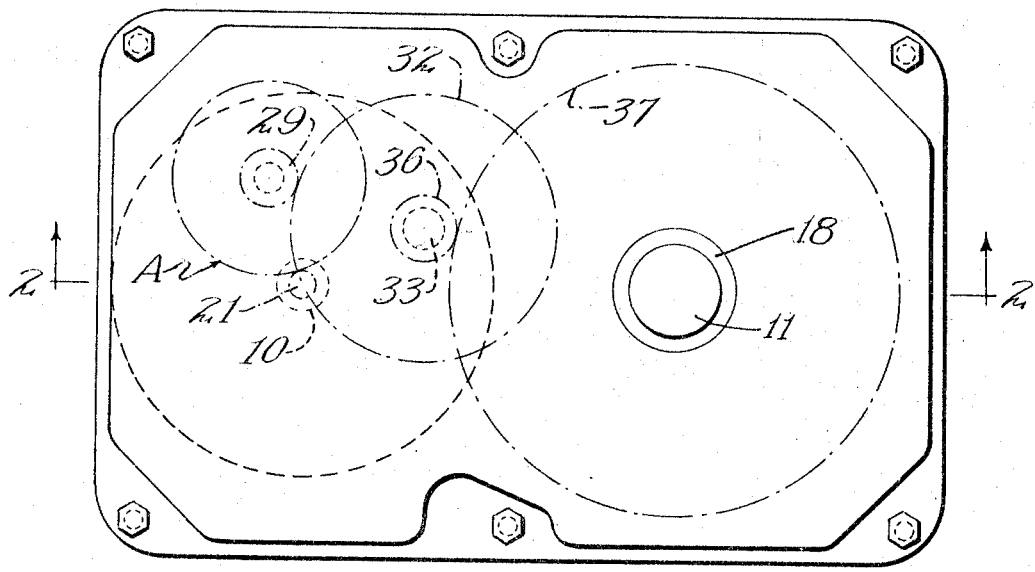
FIGURE 1 is a plan view of a gear reduction unit, showing the general arrangement of the gears located therein.
Figure 3:
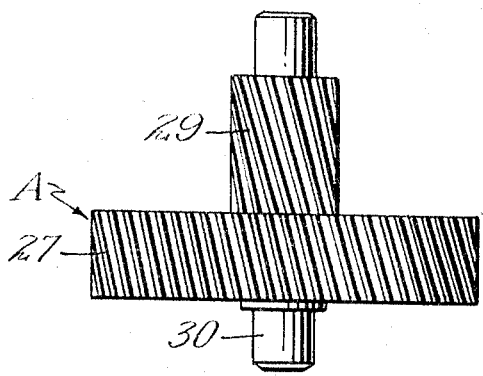
FIGURE 3 is an elevational view of the torque clutch.

As an explanation in general of the structure shown in FIGURES 1 and 2, the gear housing 13 comprises a concave lower section 14 and a convex upper section 15 which are secured in edge abutting relation by suitable means and sealed by suitable sealing means 16. The motor housing 12 fits in telescopic relation with a circular boss 17 on the bottom panel 19 of the lower housing section 14. A bearing 20 encircles the drive shaft 10 to support the same. A vertically elongated gear 21 is mounted upon, or is formed integrally with, the upper end of the drive shaft 10.

The driven shaft 11 is supported in a sleeve 18 mounted on a vertical axis by a bearing 22 supported in an indentation 23 in the lower housing section 14, and by a bearing 24 supported within a peripheral wall 25 depending from the top panel 26 of the upper section 15. FIGURE 1 diagrammatically illustrates the gear 21 on the drive shaft 10, the clutch unit A having peripheral teeth 27 in mesh with the teeth of the gear 21 and a relatively rotatable gear 29 mounted upon the vertical shaft 30 which forms the axis of the torque clutch. The gear 29 is in mesh with a large diameter gear 32 mounted upon a vertical shaft 33 supported by bearings 34 and 35 in the bottom and top sections respectively of the housing 13. A small diameter gear 36 coaxial with the gear 32 engages the large diameter gear 37 which is keyed to the sleeve 18 as indicated at 39. A gear train is thus provided which rotates the sleeve 18 at a speed which is slow relative to the speed of rotation of the drive shaft 10. The driven shaft 11 is connected for rotation with the sleeve 18 in any suitable manner.

The gear box described is not particularly unique with the exception of the torque clutch unit A. However, for the purpose of explanation, it should be indicated that the gear housing 13 is normally filled with a lubricant to a point above the level of the torque clutch A so that the rotating gears are normally immersed in lubricant. While the specific environment of the torque clutch may not be important, it is of importance that the clutch be located beneath the level of hydraulic fluids such as a liquid lubricant.

With reference now to FIGURES 4, 5, and 6 of the drawings it will be seen that the torque clutch A comprises a housing including a circular bottom plate 40 having a substantially cylindrical outer upstanding wall 41, the outer surface of which is toothed as indicated at 42 to accommodate the teeth of the gear 21 on the drive shaft 10. A top closure plate 43 closes the major portion of the upper surface of the housing, and is rabbeted into the peripheral wall 41 to form a seal therebetween. The inner surface of the peripheral wall 40 is also internally toothed as indicated at 44. A sun gear 45 is keyed to the vertical shaft 30 as indicated at 46. The sun gear 45 is externally toothed as indicated at 47, the teeth 47 being concentric with, and spaced inwardly from, the internal teeth 44. A series of equally angularly spaced planet gears 49 mesh with the external teeth 47 of the sun gear 45, and with the internal teeth 44 of the housing flange 40.

As is indicated in FIGURE 6 of the drawings, the top closure plate 43 as well as the bottom closure plate 40 are provided with a series of angularly spaced apertures 50. The angular distance between the apertures 50 is slightly in excess of the outer diameters of the planet gears 49. Furthermore, the number of planet gears is not a direct multiple of the number of apertures 50. For example, in the construction illustrated, there are eight equally angularly spaced apertures 50, and eighteen equally angularly spaced planet gears 49. As a result, the spaces between the apertures 50 are sufficient so that fluid is trapped between certain of these gears between the apertures 50, making it somewhat difficult for the sun gear 45 to rotate relative to the outer housing. As a result, when the rotation of the sleeve 21 is not unduly limited, the outer housing of the clutch will rotate in unison with the sun gear 45. However, when the driven member is subjected to undue and unusual forces, relative rotation between the sun gear and the housing is possible. In other words, the planet gears must act somewhat in the manner of the gears of a gear pump to pump the oil from one opening to another upon relative rotation between the two members.

With the present arrangement, under normal weather conditions, the motor will drive the drive shaft 10 at a constant speed, and the gear train will function to rotate the sleeve 18 also at a considerable slower constant speed. However, when the sign is subjected to severe weather conditions, tending to resist rotation of the sign or at least to retard it, the epicyclic gear train will function to pump fluid upon relative rotation between the gears, thereby permitting relative rotation without undue strain either upon the drive motor or upon the component parts of the apparatus.

In accordance with the Patent Office statutes, I have described the principles of construction and opertaion of my improvement in "torque clutch," and while I have endeavored to set forth the best embodiment thereof, I desire to have it understood that changes may be made within the scope of the following claim without departing from the spirit of my invention.

I claim:
1. A hydraulic torque clutch including:
   a substantially vertical shaft,
   a first gear mounted on said shaft and rotatable therewith,
   a gear housing encircling said gear and having top and bottom plates substantially in face contact with the upper and lower surfaces of said gear,
   said gear housing having secured thereto an internal gear concentric with said first gear,
   a series of angularly spaced planet gears engaging said first gear and said internal gear for orbital movement about said first gear,
   at least one of said top and bottom plates having spaced apertures therethrough communicating with the area between said first gear and said internal gear,
   said apertures being spaced apart a distance greater than the distance between the planet gears,
   an outer housing supporting said shaft and containing a hydraulic fluid covering said first mentioned gear housing and means for rotating said gear housing about its axis,
   an external gear on said gear housing connected to said means for rotating said housing, and a gear on said shaft externally of said gear housing,
   whereby when said gear housing rotates relative to said shafts said planet gears function to pump liquid tending to restrain said planet gears from rotation.

References Cited

UNITED STATES PATENTS

| 2,371,227 | 3/1945 | Dodge | 192—61 |
| 2,371,228 | 3/1945 | Dodge | 192—61 X |
| 2,406,612 | 8/1946 | Landrum | 192—61 |
| 2,678,710 | 5/1954 | Sterne | 192—61 |
| 2,727,608 | 12/1955 | Smith | 192—61 |
| 2,743,628 | 5/1956 | Scharaffa | 192—61 X |
| 3,099,926 | 8/1963 | Thorpe | 192—61 X |
| 3,351,168 | 11/1967 | Thorpe | 192—61 |
| 2,435,244 | 2/1948 | Stephens | 192—61 |
| 3,008,355 | 11/1961 | Grudin | 74—801 |
| 3,204,736 | 9/1965 | Trimmer | 192—58 |
| 3,301,096 | 1/1967 | Thompson | 74—774 |

ARTHUR T. McKEON, Primary Examiner

U.S. Cl. X.R.

74—774, 794